United States Patent
Wilson et al.

(10) Patent No.: US 9,522,508 B2
(45) Date of Patent: Dec. 20, 2016

(54) PLURAL BLOW UTILIZATION OF COUNTER STRETCH ROD AND/OR BASE PUSHUP

(71) Applicant: Amcor Limited, Hawthorn, Victoria (AU)

(72) Inventors: Bradley Wilson, Manchester, MI (US); Peter Bates, Chelsea, MI (US); Frederick C. Beuerle, Jackson, MI (US); George David Lisch, Jackson, MI (US); Reinhard C. J. Luchies, Ann Arbor, MI (US); Luke A. Mast, Brooklyn, MI (US)

(73) Assignee: Amcor Limited, Hawthorn (AU)

( * ) Notice: Subject to any disclaimer, the term of this patent is extended or adjusted under 35 U.S.C. 154(b) by 78 days.

(21) Appl. No.: 14/358,122

(22) PCT Filed: Nov. 13, 2012

(86) PCT No.: PCT/US2012/064793
§ 371 (c)(1),
(2) Date: May 14, 2014

(87) PCT Pub. No.: WO2013/074502
PCT Pub. Date: May 23, 2013

(65) Prior Publication Data
US 2014/0312538 A1    Oct. 23, 2014

Related U.S. Application Data

(60) Provisional application No. 61/560,122, filed on Nov. 15, 2011.

(51) Int. Cl.
*B29D 22/00*     (2006.01)
*B29C 49/18*     (2006.01)
(Continued)

(52) U.S. Cl.
CPC .......... *B29D 22/003* (2013.01); *B29C 49/185* (2013.01); *B29B 11/06* (2013.01); *B29B 11/08* (2013.01);
(Continued)

(58) Field of Classification Search
None
See application file for complete search history.

(56) References Cited

U.S. PATENT DOCUMENTS 4,177,239 A * 12/1979 Gittner ................... B29C 49/08
                                                    264/529
5,090,180 A *  2/1992 Sorensen ................ B29C 51/00
                                                     53/281
(Continued)

FOREIGN PATENT DOCUMENTS

EP    1510325 A1    3/2005
EP    2517862 A1   10/2012
(Continued)

OTHER PUBLICATIONS

Supplementary European Search Report issued Mar. 20, 2015 in corresponding European Patent Application Serial No. 12848994 (eight pages).
(Continued)

*Primary Examiner* — Monica Huson
(74) *Attorney, Agent, or Firm* — Harness, Dickey & Pierce, PLC

(57) ABSTRACT

A molding system for molding a container includes a first blow mold operable for blow molding a first form of the container and a second blow mold operable for blow molding a second form of the container. The system further includes a counter stretch rod and/or a base pushup operable for reducing a height of the first form of the container before
(Continued)

blow molding the second form of the container. A corresponding method of forming a container is also disclosed.

13 Claims, 3 Drawing Sheets

(51) Int. Cl.
  *B29C 49/42* (2006.01)
  *B29C 49/48* (2006.01)
  *B29B 11/14* (2006.01)
  *B29C 49/12* (2006.01)
  *B29L 31/00* (2006.01)
  *B29C 49/06* (2006.01)
  *B29C 49/14* (2006.01)
  *B29B 11/06* (2006.01)
  *B29B 11/08* (2006.01)
  *B29B 11/10* (2006.01)
  *B29C 49/54* (2006.01)
  *B29C 49/64* (2006.01)

(52) U.S. Cl.
  CPC ........... *B29B 11/10* (2013.01); *B29B 11/14* (2013.01); *B29B 2911/1444* (2013.01); *B29B 2911/14333* (2013.01); *B29B 2911/14366* (2013.01); *B29B 2911/14386* (2013.01); *B29B 2911/14426* (2013.01); *B29B 2911/14486* (2013.01); *B29C 49/06* (2013.01); *B29C 49/12* (2013.01); *B29C 49/14* (2013.01); *B29C 49/42* (2013.01); *B29C 49/48* (2013.01); *B29C 49/541* (2013.01); *B29C 49/649* (2013.01); *B29C 49/6481* (2013.01); *B29C 2049/1219* (2013.01); *B29C 2049/1238* (2013.01); *B29C 2049/4843* (2013.01); *B29C 2791/001* (2013.01); *B29C 2793/009* (2013.01); *B29C 2793/0027* (2013.01); *B29K 2995/0043* (2013.01); *B29L 2031/716* (2013.01); *B29L 2031/7158* (2013.01)

(56) References Cited

U.S. PATENT DOCUMENTS

| | | |
|---|---|---|
| 5,829,614 A | 11/1998 | Collette et al. |
| 6,090,334 A | 7/2000 | Matsuno et al. |
| 6,224,817 B1 | 5/2001 | Villers |
| 7,833,466 B2 | 11/2010 | Hirota et al. |
| 2005/0140036 A1* | 6/2005 | Hirota ............... B29C 49/18 264/40.1 |
| 2011/0204067 A1 | 8/2011 | Schneider et al. |
| 2011/0248429 A1 | 10/2011 | Maeda et al. |

FOREIGN PATENT DOCUMENTS

| | | |
|---|---|---|
| JP | 2003-103609 A | 4/2003 |
| JP | 2011-218722 A | 11/2011 |
| WO | WO-99-52701 A1 | 10/1999 |
| WO | WO-2011-078111 A1 | 6/2011 |

OTHER PUBLICATIONS

International Search Report and Written Opinion for PCT/US2012/064793, mailed Apr. 1, 2013; ISA/KR.

* cited by examiner

PLURAL BLOW UTILIZATION OF COUNTER STRETCH ROD AND/OR BASE PUSHUP

CROSS-REFERENCE TO RELATED APPLICATIONS

This application claims the benefit of U.S. Provisional Application No. 61/560,122, filed on Nov. 15, 2011. The entire disclosure of the above application is incorporated herein by reference.

FIELD

This disclosure generally relates to forming and filling a plastic container. More specifically, this disclosure relates to a process for forming a plural blown container using a counter stretch rod and/or base pushup.

BACKGROUND

This section provides background information related to the present disclosure which is not necessarily prior art.

As a result of environmental and other concerns, plastic containers (more specifically polyester and even more specifically polyethylene terephthalate (PET) containers) are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material, $\rho_a$ is the density of pure amorphous PET material (1.333 g/cc), and $\rho_c$ is the density of pure crystalline material (1.455 g/cc). Once a container has been blown, a commodity may be filled into the container.

SUMMARY

This section provides a general summary of the disclosure, and is not a comprehensive disclosure of its full scope or all of its features.

A method of forming a container is disclosed. The method includes blow molding a first form of the container and blow molding a second form of the container after blow molding the first form. The method also includes reducing a height of the first form of the container before blow molding the second form of the container.

A molding system for molding a container is also disclosed. The system includes a first blow mold operable for blow molding a first form of the container and a second blow mold operable for blow molding a second form of the container. The system further includes a counter stretch rod operable and/or a base pushup for reducing a height of the first form of the container before blow molding the second form of the container.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
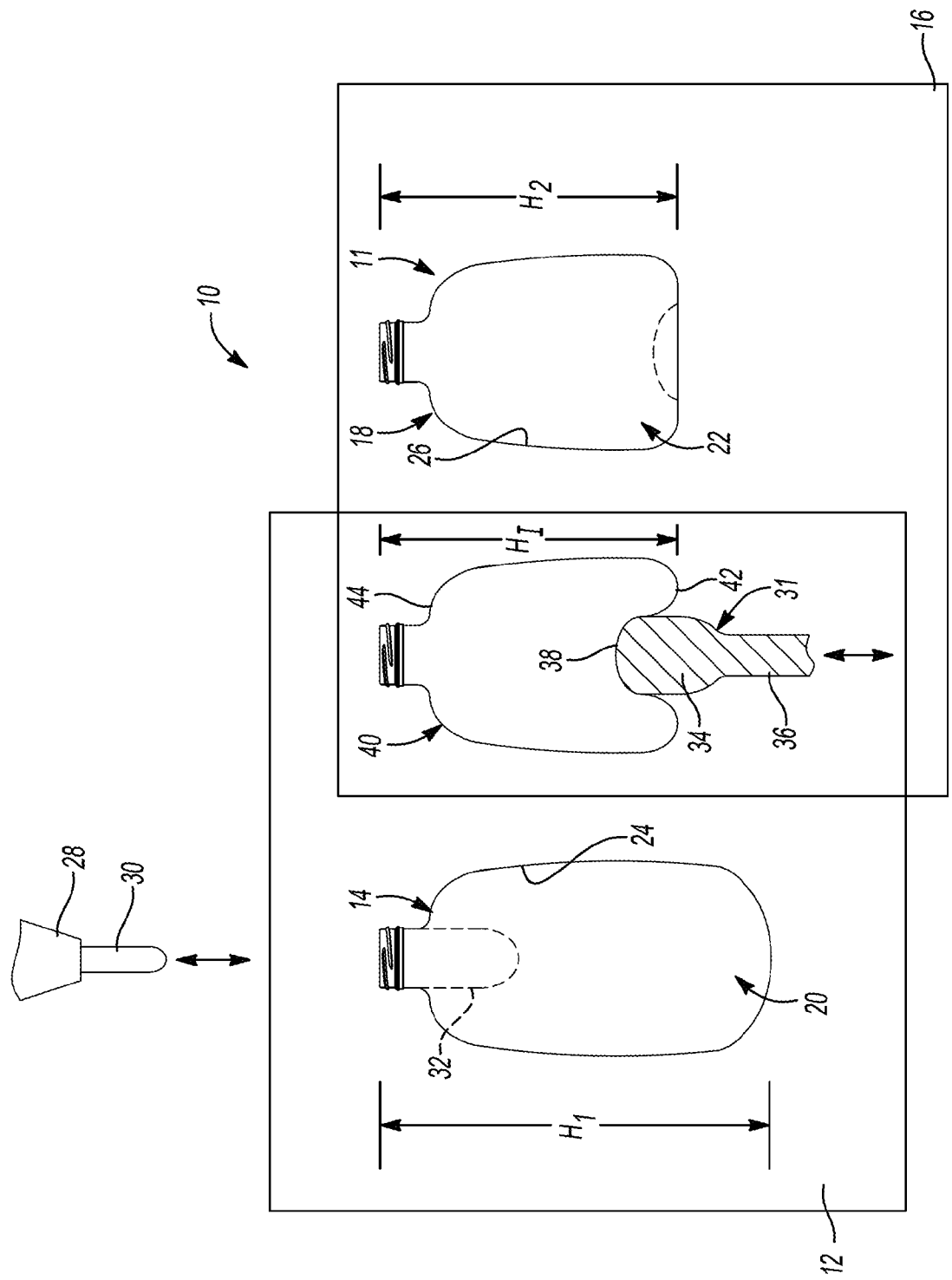
FIG. 1 is a schematic illustration of a molding system for molding a container according to exemplary embodiments of the present disclosure.

Referring initially to FIG. 1, a molding system 10 is schematically illustrated according to exemplary embodiments of the present disclosure. As will be discussed, the system 10 can be used for forming a container 11 through a plurality of blow molding steps. The container 11 can be made of PET or another suitable material. In the embodiments illustrated, there can be two blow molding steps (i.e., double blow molding); however, there can be any number of blow molding steps without departing from the scope of the present disclosure.

The container 11 can have any suitable size and shape (e.g., approximately twenty-four ounce capacity). Also, the container 11 can be operable for hot filling, pasteurization, and/or retort processes. The plural molding operations can be designed to ensure that material of the container 11 is distributed in a desirable fashion, such that the container 11 has adequate crystallinity, such that the container 10 has adequate structural integrity, etc.

As shown, the molding system 10 can generally include a first mold 12 for blow molding and formation of a first form 14 (i.e. primary article) of the container 11. The system 10 can also include a second mold 16 for blow molding and formation of a second form 18 (i.e., a secondary article) of the container 11. In the embodiments illustrated, the second form 18 is the final form of the container 11 (i.e., no further blow molding occurs); however, in other embodiments, the second form 18 can be further blow molded to form the container 11.

The first and second molds 12, 16 are represented schematically in FIG. 1 as individual squares. The molds 12, 16 are shown overlapping for purposes that will be discussed below.

The first mold 12 and the second mold 16 can each define an internal cavity 20, 22, respectively. More specifically, inner surfaces 24, 26 of the molds 12, 16 can define the cavities 20, 22, respectively. The cavities 20, 22 can have any suitable shape for blow molding the first and second forms 14, 18 as desired.

The system 10 can further include one or more blow nozzles 28. The blow nozzle 28 can be of a known type that introduces a fluid (air) into the first mold 12 to create the first form 14. The blow nozzle 28 can also subsequently introduce fluid into the second mold 16 to create the second form 18. In some embodiments, the same blow nozzle 28 forms the first form 14 and the second form 18, but in other embodiments, there are individual blow nozzles 28 that form the first and second forms 14, 18.

The system 10 can additionally include a stretch rod 30. The stretch rod 30 can be of a known type and can be moveably attached to the blow nozzle 28. Specifically, the stretch rod 30 can move linearly toward and away from the blow nozzle 28 during formation of the first form 14 and/or formation of the second form 18 as will be discussed in greater detail.

Furthermore, the system can include a counter stretch rod 31. The counter stretch rod 31 can be of a known type with an enlarged head 34 and a shaft 36 extending away from the head 34. The head 34 can also include a terminal end surface 38 that faces away from the shaft 36. The counter stretch rod 31 can move inside either the first mold 12 or the second mold 16. (FIG. 1 shows the counter stretch rod 31 inside the overlapping area of the boxes representing the first and second molds 12, 16 to illustrate that the counter stretch rod 31 can move inside either the first mold 12 or the second mold 16.) Specifically, the counter stretch rod 31 can move linearly (e.g., up and down) within the internal cavity 20, 22 of the respective mold 12, 16. In other embodiments, the counter stretch rod 31 can be located outside the first and second molds 12, 16.

As will be discussed, the counter stretch rod 31 can be used to reduce a first height $H_1$ of the first form 14. Specifically, the counter stretch rod 31 can push a base 42 of the first form 14 toward an upper end 44 of the first form 14 to reduce the first height $H_1$ and form an intermediate form 40 having an intermediate height $H_I$. Then, the intermediate form 40 can be loaded inside the second mold 16 to form the second form 18 to a second height $H_2$. As shown in FIG. 1, the second height $H_2$ can be less than the first height $H_1$, and the intermediate height $H_I$ can be less than the second height $H_2$.

In additional embodiments, the system can include a base pushup, which can be used as an alternative or in addition to the counter stretch rod 31 for reducing the first height $H_1$ of the first form 14. The following discussion will relate to the counter stretch rod 31; however, it will be appreciated that the function of reducing the first height $H_1$ of the first form 14 can be achieved solely using the base pushup, or the base pushup and the counter stretch rod 31 can be used in combination to reduce the height $H_1$ of the first form 14.

Manufacture of the container 11 will now be discussed in greater detail. To form the container 11, a preform 32 (shown in phantom in FIG. 1) can be positioned inside the first mold 12, and the preform 32 can be heated in a known manner. Then, the blow nozzle 28 can operably couple to the preform 32 and/or the first mold 12, and the stretch rod 30 can actuate into the preform 32 to stretch the preform 32. The stretch rod 30 can stretch the preform 32 to any suitable length, and in some embodiments, the stretch rod 30 can stretch the preform 32 to a length that is less than, approximately equal to, or greater than the final container height $H_2$. Next, the blow nozzle 28 can blow fluid into the preform 32 to propel the material of the preform 32 against the inner surface 24 of the first mold 12 to create the first form 14. Thus, it will be appreciated that the first form 14 can be stretch blow molded from the preform 32. However, the first form 14 can be created via extrusion blow molding, injection blow molding, or in any other manner without departing from the scope of the present disclosure. It will also be appreciated that heat can be transferred to the first form 14 and/or the first form 14 can be held for a predetermined time within the first mold 12 to ensure that the first form 14 has a preferred crystallinity.

Next, the counter stretch rod 31 can push the base 42 of the first form 14 toward the upper end 44 to reduce the height $H_1$ to the intermediate height $H_I$. As mentioned above, the counter stretch rod 31 can be used inside the first mold 12; therefore, the counter stretch rod 31 can shorten the intermediate form 40 such that the intermediate form 40 fits within the second mold 16. Also, as mentioned above, the counter stretch rod 31 can be used inside the second mold 16. In these embodiments, the counter stretch rod 31 can be used before the second mold 16 is fully closed to ensure that the intermediate form 40 fits within the second mold 16 when closed.

Subsequently, assuming that the intermediate form 40 is positioned within the second mold 16, the blow nozzle 28 can be used to blow mold the second form 18 to the second height $H_2$. Heat can be transferred to the second form 18 and/or the second form 18 can be held for a predetermined time inside the second mold 16 to ensure proper crystallinity of the second form 18. Then, the second form 18 can be removed from the second mold 16, and the second form 18 can be processed further (e.g., can be labeled or otherwise marked, etc.) for completing the container 11. Then, the container 11 can be filled with a commodity (not shown). A cap (not shown) or other closure can also be attached to the container 11 to thereby seal the commodity therein.

In some embodiments, the second height $H_2$ is between approximately one percent to thirty percent (1%-30%) shorter than the first height $H_1$. Also, in some embodiments, the intermediate height $H_I$ can be at least two millimeters shorter than the second height $H_2$. It will be appreciated that the heights $H_1$, $H_2$, $H_I$ can have any suitable value for allowing over-stretching of the material of the container 11 and promoting high crystal growth therein. It will also be appreciated that first form 14, the intermediate form 40, and/or the second form 18 can spring-back (i.e., reduce in size) after formation, and various process parameters can be designed to account for the size change(s).

Furthermore, in some embodiments, the counter stretch rod 31 and the stretch rod 30 can be used cooperatively, for instance, to hold the base 42. For instance, the counter stretch rod 31 and the stretch rod 30 can be positioned to coincidentally abut against opposite surfaces of the base 42 to hold the intermediate form 40 in a substantially fixed position within the second mold 16. As such, even though the intermediate form 40 may be larger than the internal cavity 22 off the second mold 16, the intermediate form 40 can limit movement of the intermediate form 40 therein. It will be appreciated that other means can be employed for limiting movement of the intermediate form 40 within the second mold 16 as well.

Figure 2:
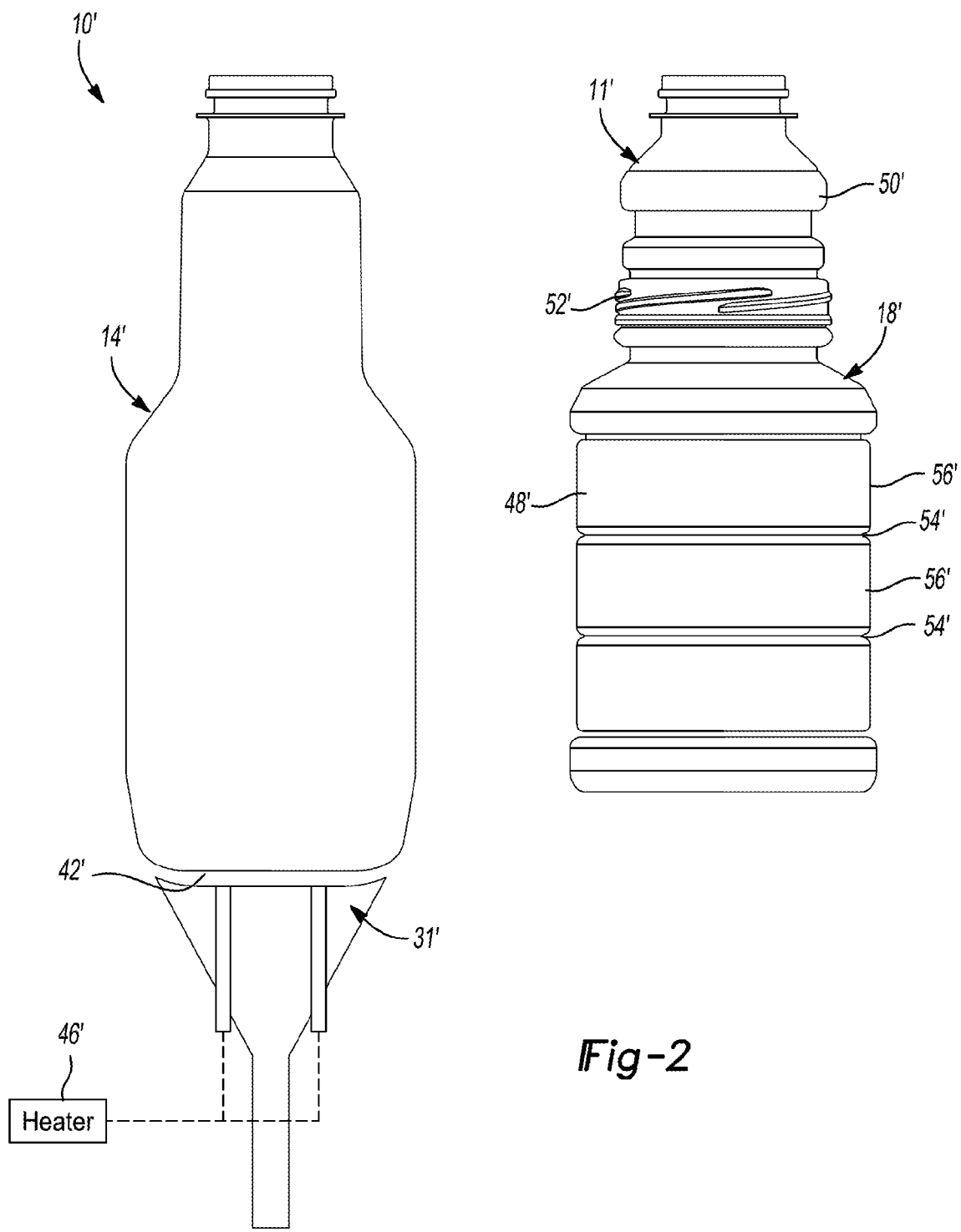
FIG. 2 is a schematic illustration of a first form of a container formed using the molding system of FIG. 1, a counter stretch rod of the molding system of FIG. 1, and a second form of the container formed using the molding system of FIG. 1.

Referring now to FIG. 2, additional details of the system 10' will be discussed. The first form 14', the second form 18', and the counter stretch rod 31' are illustrated according to exemplary embodiments.

As shown, a heater 46' can be included for transferring heat directly to the counter stretch rod 31'. The heater 46' can be of any suitable type, such as an electrical resistance-type heating element, etc. Also, the heater 46' can heat the counter stretch rod 31' to between 185 and 210 degrees Fahrenheit in some embodiments. Thus, the counter stretch rod 31' can transfer heat directly to the base 42', for instance, to increase crystallinity of the base 42'.

Also, the counter stretch rod 31' can have a width approximately equal to that of the base 42' in the embodiments illustrated. It will be appreciated that the width and shape of the counter stretch rod 31' can be chosen to form the base 42' as desired.

Moreover, the second form 18' can be formed to include several features not included on the first form 14'. For instance, the second form 18' can include a main body 48' and a trim portion 50'. The trim portion 50' can be trimmed from the main body 48' after formation. Also, the main body 48' can include a threaded finish 52' that is formed during the blow molding of the second form 18'. Furthermore, the second form 18' can include one or more radial grooves 54', lands 56' between the grooves 54', and other surface features.

Figures 3A, 3B:
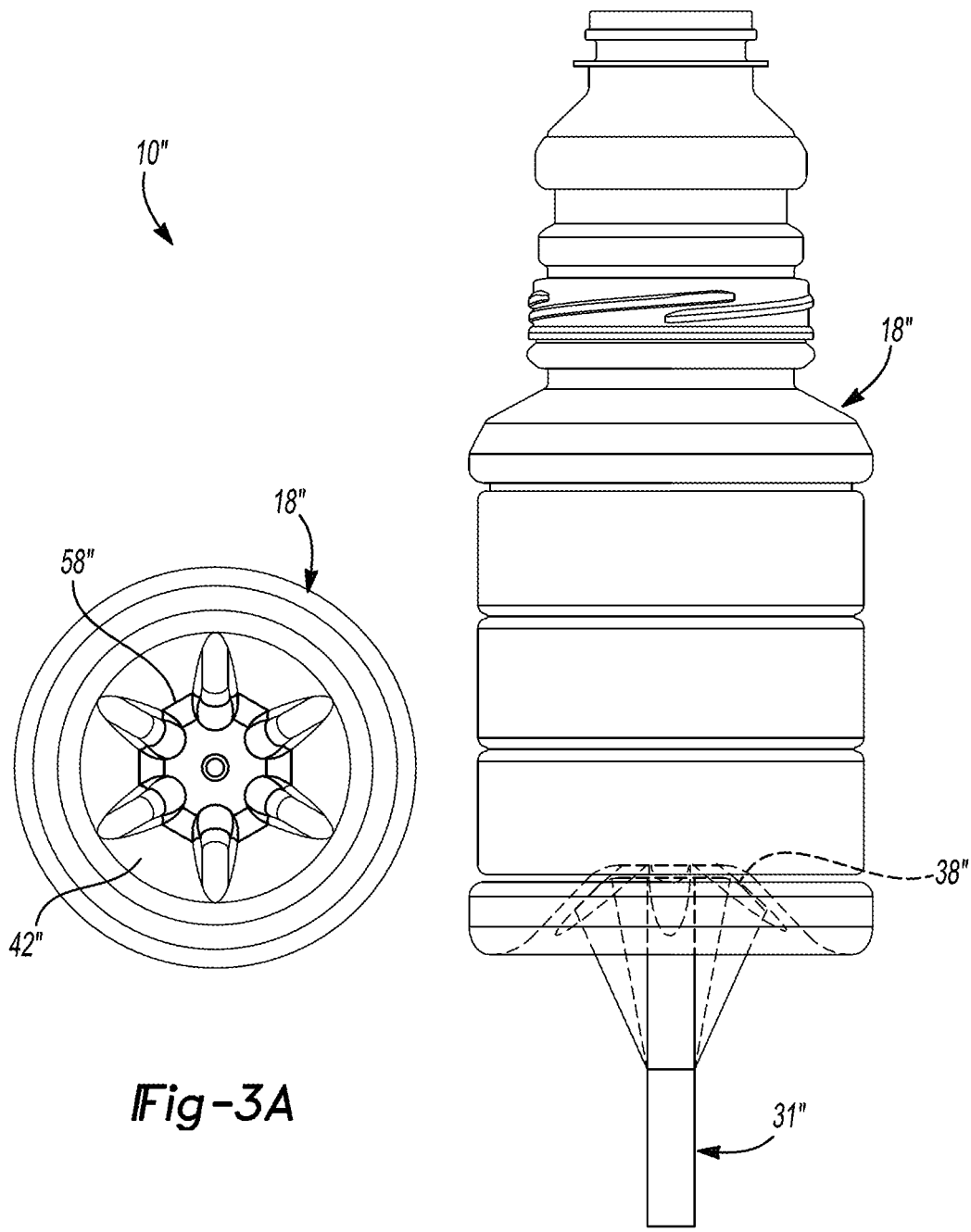
FIGS. 3A and 3B include a bottom view and a side view, respectively, of the second form of the container formed using the molding system of FIG. 1.

Referring now to FIGS. 3A and 3B, additional features of the system 10" are illustrated according to various exemplary embodiments. The second form 18" and the counter stretch rod 31" are shown.

The end surface 38" of the counter stretch rod 31" can be textured, contoured, or otherwise shaped so as to at least partially form the base 42" of the second form 18". In the embodiments shown, the base 42" can include a generally star-shaped base 42", which is largely formed by the counter stretch rod 31" pushing on the base 42".

Also, heat from the counter stretch rod 31" can be concentrated in certain areas on the base 42" to increase crystallinity in those areas. In the embodiments illustrated in FIG. 3A, the heat is concentrated within a generally hexagonal boundary line 58" on the base 42". The boundary line 58" can be axially centered on the container 11".

Thus, the system 10 and its method of use can produce a very robust container 11, 11', 11". By reducing the size of the container 11, 11', 11" before final blowing, the counter stretch rod 31, 31', 31" can promote high crystallinity.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a container comprising:
    blow molding a first form of the container to have a first height;
    blow molding a second form of the container to have a second height that is less than the first height after blow molding the first form; and
    reducing a height of the first form of the container before blow molding the second form of the container, reducing the height includes reducing the height of the first form from the first height to an intermediate height, the intermediate height being less than the first height and less than the second height;
    wherein:
        reducing the height of the first form includes reducing the height using at least one of a counter stretch rod and a base pushup that pushes a base of the first form toward an upper end of the first form;
        blow molding the first form includes blow molding the first form in a first mold;
        blow molding the second form includes blow molding the second form in a second mold; and
        reducing the height of the first form occurs inside the first mold.

2. The method of claim 1, wherein reducing the height of the first form includes reducing the height using both the counter stretch rod and the base pushup.

3. The method of claim 1, further comprising heating the at least one of the counter stretch rod and the base pushup and wherein reducing the height of the first form includes reducing the height using the at least one of the heated counter stretch rod and the heated base pushup.

4. The method of claim 1, wherein reducing the height of the first form includes reducing the height using the at least one of the counter stretch rod and the base pushup to form a surface of a base of the second form.

5. The method of claim 1, wherein the second height is between approximately one percent to thirty percent (1%-30%) shorter than the first height.

6. The method of claim 1, wherein the third height is at least two millimeters shorter than the second height.

7. The method of claim 1, further comprising cooperatively holding a base of the container between a stretch rod and the counter stretch rod.

8. A molding system for molding a container comprising:
    a first blow mold operable for blow molding a first form of the container;
    a second blow mold operable for blow molding a second form of the container; and
    at least one of a counter stretch rod and a base pushup operable for reducing a height of the first form of the container before blow molding the second form of the container by pushing a base of the first form towards an upper end of the first form;
    wherein:
        the first blow mold has a first height for forming the first form to the first height;
        the second blow mold has a second height for forming the second form to the second height;
        the at least one of the counter stretch rod and the base pushup is operable to reduce the height of the first form from the first height to an intermediate height, the intermediate height being less than the first height and less than the second height; and
        the height of the first form is reduced from the first height to the intermediate height inside the first mold.

9. The molding system of claim 8, further comprising a heater that heats the at least one of the counter stretch rod and the base pushup for heating the first form of the container while reducing the height of the first form of the container.

10. The molding system of claim 8, wherein the at least one of the counter stretch rod and the base pushup is operable to form a surface of a base of the second form.

11. The molding system of claim 8, wherein the at least one of the counter stretch rod and the base pushup is operable to reduce the height of the first form while the first form is located within the first mold.

12. The molding system of claim 8, further comprising a stretch rod, the stretch rod and the counter stretch rod operable to cooperatively hold a base of the container therebetween.

13. A molding system for molding a container comprising:
- a first blow mold configured for blow molding a first form of the container, the first blow mold has a first height for forming the first form to the first height;
- a second blow mold configured for blow molding a second form of the container, the second blow mold has a second height for forming the second form to the second height; and
- at least one of a counter stretch rod and a base pushup configured to push a base of the first form towards an upper end of the first form to reduce a height of the first form of the container to an intermediate height before blow molding the second form of the container, the intermediate height is less than the first height and less than the second height;
- wherein the at least one of the counter stretch rod and the base pushup is configured to reduce the height of the first form while the first form is located within the first mold.

* * * * *